(12) United States Patent
Shiu et al.

(10) Patent No.: US 8,836,241 B2
(45) Date of Patent: Sep. 16, 2014

(54) LED DRIVING CIRCUIT AND DRIVING CONTROLLER FOR CONTROLLING THE SAME

(71) Applicant: Green Solution Technology Co., Ltd., New Taipei (TW)

(72) Inventors: Shian-Sung Shiu, Taipei County (TW); JuanJuan Liu, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 0 days.

(21) Appl. No.: 13/737,291

(22) Filed: Jan. 9, 2013

(65) Prior Publication Data
US 2013/0119895 A1 May 16, 2013

Related U.S. Application Data

(62) Division of application No. 12/836,770, filed on Jul. 15, 2010, now Pat. No. 8,400,078.

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |

(52) U.S. Cl.
USPC ........... 315/307; 315/121; 315/127; 315/193; 315/297

(58) Field of Classification Search
None
See application file for complete search history.

(56) References Cited

U.S. PATENT DOCUMENTS

| | | | |
|---|---|---|---|
| 6,008,594 A | 12/1999 | Kita et al. | |
| 6,239,558 B1 | 5/2001 | Fujimura et al. | |
| 7,675,245 B2* | 3/2010 | Szczeszynski et al. | 315/291 |
| 2005/0110469 A1* | 5/2005 | Inaba et al. | 323/222 |
| 2006/0158131 A1 | 7/2006 | Mitsuyasu et al. | |
| 2008/0018262 A1 | 1/2008 | Green | |
| 2010/0315017 A1* | 12/2010 | Yu et al. | 315/291 |

FOREIGN PATENT DOCUMENTS

| | | |
|---|---|---|
| CN | 1615675 A | 5/2005 |
| CN | 101042212 A | 9/2007 |
| CN | 101154886 A | 4/2008 |
| CN | 101360379 A | 2/2009 |

* cited by examiner

*Primary Examiner* — Anh Tran
(74) *Attorney, Agent, or Firm* — Rosenberg, Klein & Lee

(57) ABSTRACT

A driving controller for driving a load is disclosed. The driving circuit includes a driving power supply and the driving controller. The driving power supply provides a first power source to the load. The controller is coupled to a second power source to receive an electric power for operating. The controller controls the amount of the electric power to the load when operating in a first mode and stops the driving power supply from providing the electric power to the load when operating in a second mode. The controller operates exclusively in the first mode before the driving power supply provides the first power source to the load.

9 Claims, 2 Drawing Sheets

LED DRIVING CIRCUIT AND DRIVING CONTROLLER FOR CONTROLLING THE SAME

CROSS-REFERENCE TO RELATED APPLICATIONS

This application is a Divisional application Ser. No. 12/836,770, filed on 15 Jul. 2010, currently pending, and entitled LED DRIVING CIRCUIT AND DRIVING CONTROLLER FOR CONTROLLING THE SAME.

BACKGROUND OF THE INVENTION

1. Field of the Invention

The present invention relates to a driving circuit and an light emitting diode (LED) driving controller, and more particularly to the LED driving circuit and the driving controller having a function of latch protection.

2. Description of Related Art

Reference is made to FIG. 1 showing a schematic diagram of the conventional driving circuit. The driving circuit has a converting circuit including an inductor L, a diode D, a transistor switch SW, and a capacitor C, and a controller 10. The driving circuit is used to drive a load 30, and a resistor R couples to this load 30 which generates a feedback signal FB according to the current flowing through the load 30. The controller 10 then generates a control signal Gate to control on or off state of the transistor switch SW according to the feedback signal FB. Accordingly, an electric power transferred from an inputted voltage VIN to an output end of the converting circuit is modulated to stabilize the current flowing through the load 30.

The controller 10 includes an error amplification circuit 12, an oscillation circuit 14, a pulse width modulation circuit 16, a driving control circuit 18, and a protection circuit 20. The error amplification circuit 12 receives a reference voltage Vref and the feedback signal FB, and accordingly generates an error amplification signal COMP. The pulse width modulation circuit 16 receives the error amplification signal COMP and a ramp signal SAW outputted from the oscillation circuit 14, in order to generate a pulse width modulation signal PWM. The driving control circuit 18 generates the control signal Gate to control the transistor switch SW according to this pulse width modulation signal PWM. The protection circuit 20 outputs a protection signal PROT to the driving control circuit 18 when the driving circuit operates abnormally. Thus, the driving control circuit 18 may temporarily stop outputting the control signal Gate to stop the transfer of the inputted voltage VIN to the converting circuit. When the abnormally condition is removed, the protection circuit 20 stops outputting the protection signal PROT, and thus the driving control circuit 18 could re-transmit the control signal Gate to switch the on/off state of the transistor switch SW.

However, the root cause of abnormality may not be identified and eliminated by the stoppage of the transmission of the control signal Gate. The driving circuit may still operate abnormally again when the control signal Gate is re-transmitted to control the on/off state of the transistor switch SW. Therefore, the conventional approach may cause more power consumption, and more un-stable, and even increase the likelihood of damaging it.

SUMMARY OF THE INVENTION

In view of the drawback of the conventional technology may incur unnecessary power consumption, destabilize the whole circuitry, or even increase the likelihood of damaging it when operating abnormally, a driving circuit and a driving controller for the driving circuit in accordance with the present invention is disclosed. The driving controller for controlling the same according to present invention may remain in a protection mode when operating abnormally until the driving controller is restarted. Furthermore, the present invention may prevent misjudgment associated with abnormal operation.

In order to achieve the above purpose, the present invention provides an LED driving controller for controlling an LED driving circuit to drive an LED module. The LED driving controller includes a feedback control unit and a protection unit. This feedback control unit outputs a control signal for adjusting a driving current in accordance with a current feedback signal indicative of the driving current flowing through the LED module. The protection unit determines whether or not generating a protection signal based on the current feedback signal to stop the LED driving circuit from outputting the driving current until the LED driving controller is restarted.

The present invention also provides a driving circuit for driving a load. The driving circuit comprises a driving power supply and a controller. The driving power supply supplies a first power source to drive the load. The controller is coupled to a second power source to receive an electric power for operating, and controls the driving power supply to supply the first power source to the load when operating in a first mode, and stops the driving power supply from supplying the first power source to the load when operating in a second mode. Wherein, the controller exclusively operates in the first mode before the driving power supply provides the first power source.

In order to further understand the characteristics and technical contents of the present invention, a description relating thereto will be made with reference to the accompanying drawings. However, the drawings are illustrative only but not used to limit the present invention.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
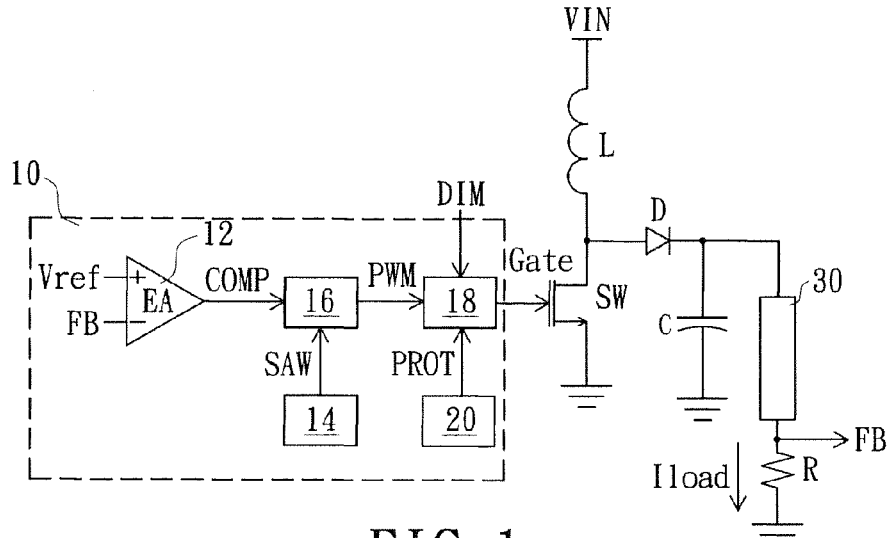
FIG. 1 shows a schematic diagram of the conventional driving circuit.
Figure 2:
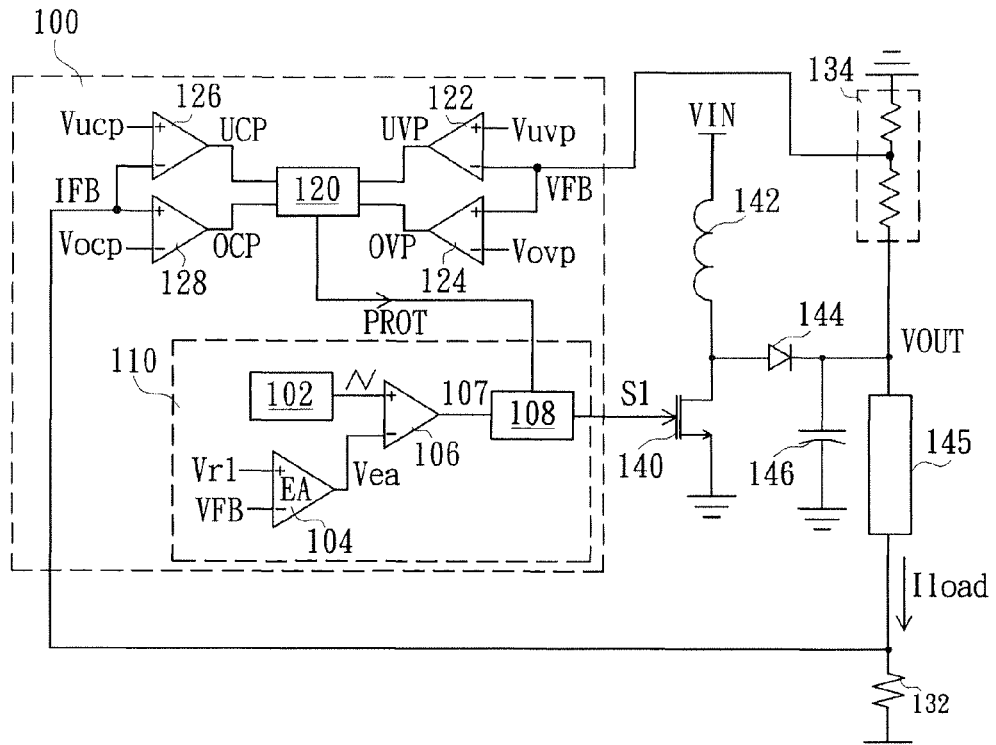
FIG. 2 is a circuit diagram illustrating a driving circuit in accordance with one embodiment of the present invention.

Please refer to FIG. 2 of a circuit diagram illustrating a driving circuit in accordance with one embodiment of the present invention. The driving circuit includes a controller 100 and a driving power supply for driving a load 145. The driving power supply includes a switch 140, an inductance 142, a diode 144, and an output capacitor 146. In one implementation, the driving power supply is a direct current to direct current (DC-DC) boost converting circuit for converting an inputted voltage VIN, coupled to the inductance 142, into an outputted voltage VOUT. The controller 100 receives a voltage feedback signal VFB generated from a voltage detection circuit 134. This voltage feedback signal VFB is indicative of a value of the outputted voltage VOUT. A control signal S1 is thus generated accordingly for controlling the switch 140 so as to stabilize the outputted voltage VOUT.

The controller 100 includes a feedback control unit 110 and a protection unit 120. The feedback control unit 110 includes an oscillation unit 102, an error amplification unit 104, a pulse width modulation unit 106, and a driving control unit 108. The error amplification unit 104 receives the voltage feedback signal VFB and a reference signal Vr1, and accordingly generates an error amplification signal Vea. The pulse width modulation unit 106 is coupled to the oscillation unit 102 and the error amplification unit 104 for receiving the error amplification signal Vea and a triangle wave signal generated by the oscillation unit 102.

The pulse width modulation unit 106 thus may generate a pulse width modulation signal 107. The driving control unit 108 is coupled to the pulse width modulation unit 106 and the protection unit 120 for receiving the pulse width modulation signal 107 and a protection signal PROT generated by the protection unit 120. The driving control unit 108 adjusts a duty cycle of a control signal S1 in accordance with the pulse width modulation signal 107. The adjustment of the duty cycle is the basis for adjusting the power supplied to the load 145. And the driving control unit 108 further determines whether to stop the power supplied to the load 145 according to the protection signal PROT.

The controller 100 further has an overly-low voltage comparison unit 122, an overly-high voltage comparison unit 124, an overly-low current comparison unit 126, and an overly-high current comparison unit 128. The overly low voltage comparison unit 122 receives the voltage feedback signal VFB and an overly low voltage reference signal Vuvp. When the level of the voltage feedback signal VFB is lower than the level of the overly-low voltage reference signal Vuvp (i.e., the output voltage VOUT is lower than a predetermined overly-low voltage threshold), the overly-low voltage comparison unit 122 may output an over-low voltage protection signal UVP. Further, the overly-high voltage comparison unit 124 receives the voltage feedback signal VFB and an overly-high voltage reference signal Vovp. When the level of the voltage feedback signal VFB is higher than the level of the overly high voltage reference signal Vovp (i.e., the output voltage VOUT is higher than a predetermined overly-high voltage threshold), the overly-high voltage comparison unit 124 outputs an overly-high voltage protection signal OVP.

Further, the overly-low current comparison unit 126 receives an overly-low current reference signal Vucp, and a current feedback signal IFB generated by a current detection circuit 132. It is noted that the current feedback signal IFB represents a level of a driving current Iload flowing through the load 145. When the level of the current feedback signal IFB is lower than the level of the overly-low current reference signal Vucp (i.e., the current Iload is lower than a predetermined overly-low current threshold), an overly-low current protection signal UCP is outputted. Still further, the overly-high current comparison unit 128 receives the current feedback signal IFB and an overly-high current reference signal Vocp. When the level of the current feedback signal IFB is higher than the level of the overly-high current reference signal Vocp (i.e., the driving current Iload is higher than a predetermined overly-high current threshold), an overly high current protection signal OCP is outputted. When the protection unit 120 receives the overly-low voltage protection signal UVP, the overly-high voltage protection signal OVP, the overly-low current protection signal UCP, or the overly-high current protection signal OCP, the protection signal PROT is outputted to stop the controller 100 from outputting the control signal S1. The stoppage of the output of the control signal S1 causes the driving power supply not to transfer the power to the load 145 until the controller 100 is restarted. In other words, in order to prevent the circuit from repeatedly attempting to back to the normal operation, the controller 100 is latched into a protection mode once the controller 100 operates abnormally.

In general, the controller 100 may release the protection unit 120 from the "latched" state for stopping outputting the protection signal PROT by sending an external re-started signal (not shown) to the protection unit 120. Alternatively, the internal circuit of the controller 100 can be reset by stopping supplying the power to the controller 100.

In addition to having the controller 100 enter into the protection mode when the controller operates abnormally, another implementation of the present invention relies on whether any one of protection detecting signals is generated for a predetermined period of time. For example, the overly-low voltage protection signal UVP, the overly-high voltage protection signal OVP, the overly-low current protection signal UCP, the overly-high current protection signal OCP, or other like protection detecting signal has been present for a corresponding predetermined period of time. If so, the protection unit 120 then outputs the protection signal PROT for preventing the controller 100 from being shut down merely because of temporary abnormality, which may be caused by accidental slight removal or touch.

Moreover, one implementation in accordance with the present invention may count the number of the occurrences of the protection detecting signals and determine whether the number exceed a predetermined threshold. If so, the protection unit 120 then outputs the protection signal PROT. In one implementation, the predetermined threshold is three. In doing so, the present invention may minimize the possibility of misjudgment as the result of temporary abnormality associated with the circuit.

Figure 3:
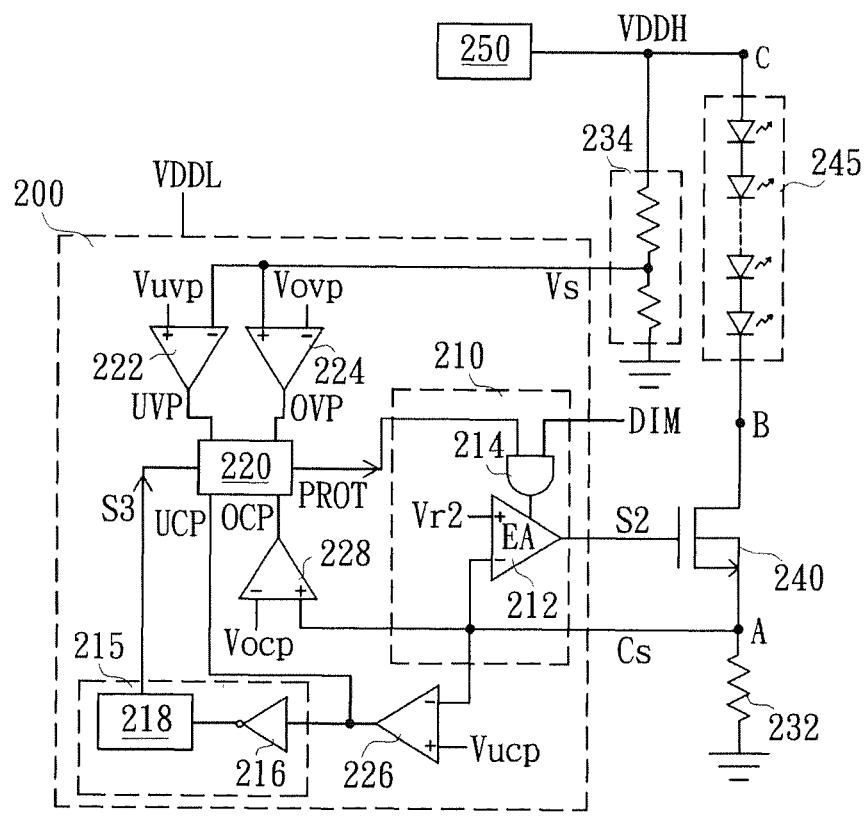
FIG. 3 a circuit diagram illustrating a driving circuit in accordance with one embodiment of the present invention.

The above-described embodiment is an exemplary example that depicts the DC-DC boost converting circuit being controlled by feedback voltage. The present invention is applicable to any driving circuit having protective function. Please FIG. 3 is a circuit diagram illustrating a driving circuit in accordance with on embodiment of the present invention. The driving circuit is FIG. 3 particularly associates with a dual power circuit system having two independent power sources for loads and a controller.

In FIG. 3, the driving circuit includes a controller 200 and a driving power supply 250. The driving power supply 250 is used to supply a first power source VDDH to drive the load 245. In one implementation, the load 245 is an LED module. The controller 200 is coupled to a second power source VDDL for receiving the required electric power. When no abnormal condition occurs in the driving circuit, the controller 200 operates in a normal mode. In the meantime, the controller 200 outputs a control signal S2 to control the switch 240, which in turn controls the power supply provided by the driving power supply 250 to the load 245. Once the controller 200 detects that the driving circuit operates abnormally, the controller 200 may operate in a protection mode in order to stop the driving power supply 250 from supplying the power to the load 245. It is worth noting that the controller 200 may make a misjudgment when an input of the first power source VDDH is later than that of the second power source VDDL. For handling the above-mentioned misjudgment, the controller 200 in accordance with the present invention may determine whether the driving power supply 250 starts to provide the first power source VDDH or not. When the first power source VDDH has not yet being supplied, the controller 200 may not operate in the protection mode.

In particular, the controller 200 includes a feedback control unit 210 and a protection unit 220. The feedback control unit 210 includes an error amplification unit 212 and an AND gate 214. The error amplification unit 212 receives a reference signal Vr2 and a current feedback signal Cs generated by a current detection circuit 232. The current feedback signal Cs may represent the level of the driving current flowing through the load 245. The control signal S2 may be generated according to the level of the driving current flowing through the load 245. In one implementation, the control signal S2 is used to control an equivalent resistance of the switch, so as to stabilize the driving current through the load 245 at a predetermined level. The AND gate is coupled to the error amplification unit 212 and the protection unit 220, and receives a light modulation signal DIM and a protection signal PROT generated by the protection unit 220. Further, whether the power is supplied to the load 245 may hinge on the protection signal PROT and the light modulation signal DIM.

The controller 200 further includes a protection starting unit 215, an overly-low voltage comparison unit 222, an overly-high voltage comparison unit 224, an overly-low current comparison unit 226, and an overly-high current comparison unit 228. The protection starting unit 215 includes an inverter 216, and a one shot circuit 218. The protection starting unit 215 is coupled to the overly-low current comparison unit 226 and the protection unit 220.

Further, the overly-low current comparison unit 226 receives a current feedback signal Cs and an overly-low current reference signal Vucp. When the first power source VDDH is not yet provided to the load 245, the level of the current feedback signal Cs is lower than the level of the overly-low current reference signal Vucp. As such, the overly-low current comparison unit 226 may output the overly-low current protection signal UCP of a "high" level. This "high" level overly-low current protection signal UCP may cause the protection unit 220 to remain inactivated since such overly-low current protection signal UCP in inverted to a low level signal through the inverter 216, which causes the one shot circuit 218 to output a low level protection starting signal. Consequently, the controller 200 may not activate the protective function when the first power source VDDH is not provided to the load 245 and thus the controller 200 may not operate in the protection mode.

Once the first power source VDDH is supplied to the load 245, the level of the current feedback signal Cs is higher than the level of the overly-low current reference signal Vucp. The overly-low current comparison unit 226 outputs a low level overly-low current protection signal UCP. Through the inverter 216, the low level overly-low current protection signal UCP is inverted to a high level. Therefore, the one shot circuit 218 may be triggered to output the high level protection starting signal, so as to start the protection unit 220.

After the protection unit 220 is started, if the level of the current feedback signal Cs is lower than the level of the overly-low current reference signal Vucp (i.e., the current flowing through the load 245 is lower than a predetermined overly-low current threshold), an overly-low current protection signal UCP is generated. The overly-low voltage comparison unit 222 receives an overly-low voltage reference signal Vuvp and a voltage feedback signal Vs. This voltage feedback signal Vs represents the driving voltage of the first power source VDDH.

When the level of the voltage feedback signal Vs is lower than the level of the overly-low voltage reference signal Vuvp (i.e., the driving voltage of the first power source VDDH is lower than a predetermined overly-low voltage threshold), an overly-low voltage protection signal UVP is outputted. The overly-high voltage comparison unit 224 receives the voltage feedback signal Vs and an overly-high voltage reference signal Vovp. When the level of the voltage feedback signal Vs is higher than the level of the overly high voltage reference signal Vovp, (i.e., the driving voltage of the first power source VDDH is higher than a predetermined overly high voltage threshold), an overly-high voltage protection signal OVP is generated. The overly-high current comparison unit 228 receives the current feedback signal Cs and an overly-high current reference signal Vocp. When the level of the current feedback signal Cs is higher than the level of the overly-high current reference signal Vocp (i.e., the current flowing through the load 245 is higher than a predetermined overly-high current threshold), an overly-high current protection signal OCP is outputted. Once the protection unit 220 receives the overly-low voltage protection signal UVP, the overly-high voltage protection signal OVP, the overly-low current protection signal UCP, or the overly-high current protection signal OCP, the protection signal PROT is outputted for stopping the controller 200 from outputting the control signal S2. Consequently, the first power source VDDH is no longer provided to the load 245 until the controller 200 is restarted.

In accordance with another embodiment of the present invention, the protection unit 220 outputs the protection signal PROT as the mentioned protection signals UVP, OVP, UCP, OCP or other like protection signals of the driving circuit have been generated for a predetermined period of time. Alternatively, the protection unit 220 outputs the protection signal PROT when the number of the occurrences of one of the protection signals UVP, OVP, UCP, OCP, or other like protection signal has been detected for more than a predetermined value in order to avoid any misjudgment associated with temporarily circuit abnormality.

Though the controller 200 may determine whether the first power source VDDH is provided to the load 245 via the state of detection point A, in another implementation the controller 200 may determine the same by detecting any one point (such as point B or C shown in FIG. 3) coupled to the driving power supply 250.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:
1. A driving circuit for driving a load, comprising:
a driving power supply for supplying a first power source;
a switch, coupled to the driving power supply for interrupting a power supplied from the first power source to the load; and
a controller coupled to a second power source to receive an electric power for operating, and switching the switch on to control the power supplied by the first power source to the load when operating in a normal mode, and switching the switch off to stop the power supplied by the first power source to the load when operating in a protection mode;
wherein the controller exclusively operates in the normal mode before the driving power supply provides the first power source when the second power source is supplied before the first power source is supplied.

2. The driving circuit of claim 1, wherein the controller enters into the protection mode when the controller detects a level of a driving voltage of the first power source being higher than a first voltage threshold, or being lower than a second voltage threshold.

3. The driving circuit of claim 1, wherein the controller enters into the protection mode when the number of occurrences of a level of a driving voltage of the first power source higher than a first voltage threshold, or otherwise lower than a second voltage threshold exceed a predetermined number.

4. The driving circuit of claim 1, wherein the controller enters into the protection mode when the number of occurrences of a level of a driving voltage of the first power source higher than a first voltage threshold, or otherwise lower than a second voltage the controller has been lasting for a predetermined period of time.

5. The driving circuit of claim 1, wherein when the controller detects a driving current flowing through the load, and the controller enters into the protection mode when a level of the driving current is higher than a first current threshold, or lower than a second current threshold.

6. The driving circuit of claim 1, wherein the controller enters into the protection mode when the number of occurrences of the driving current being higher than a first current threshold, or otherwise lower than a second current threshold exceeding a predetermined number.

7. The driving circuit of claim 1, wherein the controller enters the protection mode when the controller determines whether a level of a driving current flowing through the load higher than a first current threshold, or lower than a second current threshold for a predetermined period of time.

8. The driving circuit of claim 1, wherein the load includes an LED.

9. The driving circuit of claim 8, wherein the controller receives a light modulation signal, and controls a time period of the driving power supply supplying an electric power to the load in accordance with the light modulation signal.

* * * * *